G. JOHNSON.
Farm-Gate.
No. 220,623. Patented Oct. 14, 1879.
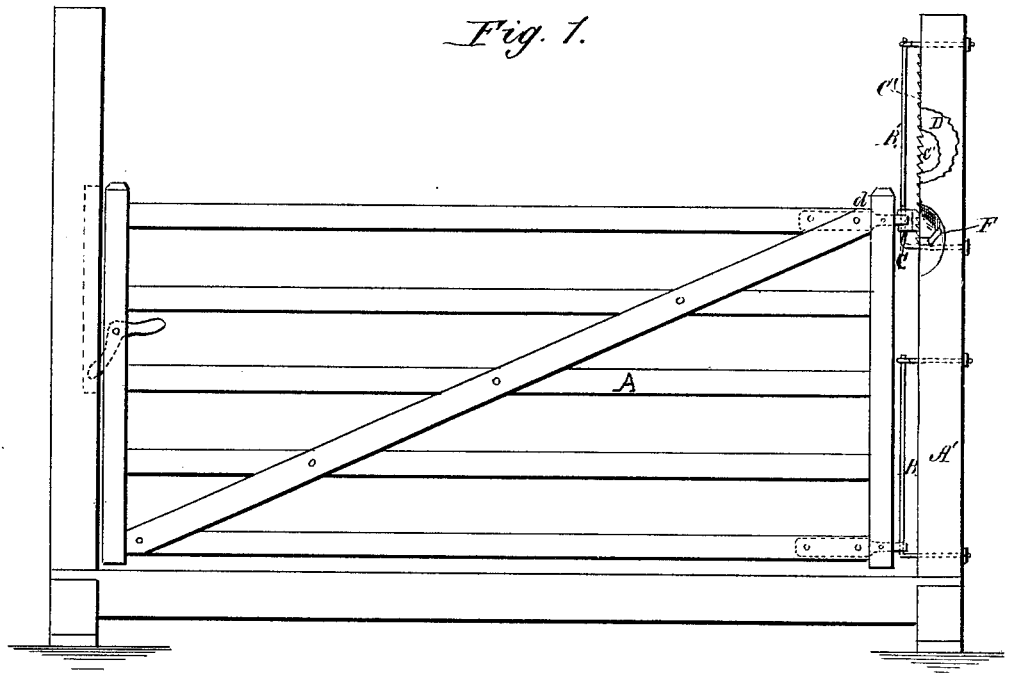
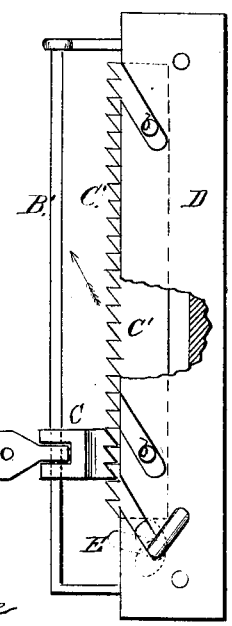
Witnesses.
John Trenkase
O. Vanorman
Inventor.
George Johnson

UNITED STATES PATENT OFFICE.

GEORGE JOHNSON, OF WAUCOUSTA, WISCONSIN.

IMPROVEMENT IN FARM-GATES.

Specification forming part of Letters Patent No. 220,623, dated October 14, 1879; application filed June 5, 1875.

*To all whom it may concern:*

Be it known that I, GEORGE JOHNSON, of Waucousta, in the county of Fond du Lac and State of Wisconsin, have invented a new and Improved Farm-Gate; and I do hereby declare that the following is a full, clear, and exact description of the same.

My invention is an improvement in the class of horizontally-swinging farm-gates, which have suitable attachments for holding them at different elevations for the purpose of avoiding snow or other obstruction, while being opened or closed.

My invention particularly relates to the construction and arrangement of the attachments or devices for holding the gate in different vertical adjustments.

In accompanying drawings, Figure 1 is a side view of the gate and attachments, a portion being broken out, and Fig. 2 is a side view of the attachment, a portion being broken out.

The gate A may be constructed in the usual manner. It swings horizontally on hinges whose pintles or stationary parts are the vertical rods B B' attached to the pivot-post A'.

The vertical adjustment of the gate A is obviously limited by the length of the rods B B' alone.

To hold the gate at any desired elevation, I employ the following devices: First, toothed catch-block C, which slides on the pintle B', and is attached to the eye $d$ of the upper gate-hinge; second, the toothed bar or dog C', which has lateral lugs $b$; third, the guide-socket D, which has diagonal slots to receive the lugs $b$ of dog C'; fourth, the eccentric E on which the lower end of the dog is supported.

The dog C' engages the catch-block C and slides in the vertical slot of guide or socket D, which is secured in a slot or cavity in the pivot-post A'.

The operation of the devices is as follows: The gate A having been raised to the desired elevation, the eccentric E is rotated by means of its handle F, thus forcing the dog C, diagonally upward into engagement with the catch-block C. The eccentric will retain its new position beneath the dog C', and thus the latter will be held locked with the dog, and the gate supported at the required height, so as to swing clear of obstructions.

It is apparent that by rotating the eccentric E back to its original position, (shown in dotted lines, Fig. 2,) the dog C' will be released from engagement with the catch C, and gravitate obliquely downward, until its lugs $b$ rest on the bottom of the slots in the guide D, thus allowing the gate to descend to its normal position.

What I claim is—

1. The combination, with the horizontally-swinging gate, a catch, C, attached to its hinge, and the elongated pintles B B', of the dog C', and a device for raising said dog and holding it engaged with the catch for the purpose of supporting the gate at different elevations, substantially as shown and described.

2. The combination of the eccentric E, having handle or operating lever F, the mortised guide D, having diagonal slots, the dog C', provided with the lateral lugs $b$, and a catch attached to the gate-hinge, as shown and described, whereby, when the eccentric is rotated, the dog is moved obliquely upward or downward to cause it to engage with or disengage from the catch, as specified.

GEORGE JOHNSON.

Witnesses:
JOHN TRENTLAGE,
O. VANORMAN,
JOHN FORSYTH.